United States Patent
Ooba

(10) Patent No.: US 8,830,503 B2
(45) Date of Patent: Sep. 9, 2014

(54) IMAGE FORMING SYSTEM INCLUDING WEB SERVER AND SCREEN UPDATE REQUESTS, WEB BROWSER-EQUIPPED PRINT CONTROL APPARATUS, AND WEB BROWSER-EQUIPPED IMAGE FORMING APPARATUS, AND METHOD OF FORMING IMAGE IN IMAGE FORMING SYSTEM

(75) Inventor: Hideaki Ooba, Sagamihara (JP)

(73) Assignee: Canon Kabushiki Kaisha (JP)

( * ) Notice: Subject to any disclaimer, the term of this patent is extended or adjusted under 35 U.S.C. 154(b) by 708 days.

(21) Appl. No.: 12/948,634

(22) Filed: Nov. 17, 2010

(65) Prior Publication Data

US 2011/0134475 A1    Jun. 9, 2011

(30) Foreign Application Priority Data

Dec. 9, 2009    (JP) .................................. 2009-279439

(51) Int. Cl.
*G06F 3/12* (2006.01)
*H04N 1/00* (2006.01)

(52) U.S. Cl.
CPC .... *H04N 1/00464* (2013.01); *H04N 2201/0062* (2013.01); *H04N 2201/0093* (2013.01); *H04N 1/00233* (2013.01); *H04N 1/00222* (2013.01); *H04N 2201/0049* (2013.01); *H04N 1/00474* (2013.01); *H04N 1/00225* (2013.01)
USPC .......................... 358/1.15; 358/1.13; 709/217

(58) Field of Classification Search
None
See application file for complete search history.

(56) References Cited

U.S. PATENT DOCUMENTS

| | | | |
|---|---|---|---|
| 2003/0011801 A1* | 1/2003 | Simpson et al. ............. | 358/1.15 |
| 2005/0018249 A1* | 1/2005 | Miura et al. ................. | 358/1.15 |
| 2005/0024671 A1* | 2/2005 | Abe ............................ | 358/1.13 |
| 2005/0193062 A1 | 9/2005 | Komine et al. | |
| 2005/0262438 A1* | 11/2005 | Armstrong et al. .......... | 715/523 |
| 2006/0259553 A1 | 11/2006 | Kawakita | |
| 2007/0282975 A1* | 12/2007 | Kato ............................ | 709/217 |
| 2008/0275961 A1* | 11/2008 | Hoshino et al. .............. | 709/217 |
| 2009/0251726 A1* | 10/2009 | Suzue ......................... | 358/1.15 |

FOREIGN PATENT DOCUMENTS

| | | |
|---|---|---|
| CN | 1661598 A | 8/2005 |
| CN | 1739100 A | 2/2006 |
| JP | 2005-085057 A | 3/2005 |

OTHER PUBLICATIONS

Office Action issued in Counterpart Chinese Application No. 201010591818.7 dated Feb. 4, 2013. English translation provided.

* cited by examiner

*Primary Examiner* — Firmin Backer
*Assistant Examiner* — Nicholas Pachol
(74) *Attorney, Agent, or Firm* — Rossi, Kimms & McDowell LLP

(57) ABSTRACT

An image forming system capable of causing cooperation between operation screens displayed on the respective web browsers of a print control apparatus and an image forming apparatus. When receiving a screen update request from the print control apparatus, the web server determines whether the request is from the print control apparatus or from the image forming apparatus. When the request is from the print control apparatus, the web server transmits screen data for causing the web browser of the print control apparatus to display an operation screen to the print control apparatus, whereas when the request is from the image forming apparatus, the web server transmits screen data for causing the web browser of the image forming apparatus to display an operation screen and screen data for causing the web browser of the print control apparatus to display an operation screen to the print control apparatus.

9 Claims, 15 Drawing Sheets

FIG.7A

```
<html>
  <head>
    <title>
      Test
    </title>
  </head>
  <body>
    <div id="main">
      :
      PAGE FOR IMAGE
      FORMING APPARATUS
      :
    </div>
    <div id="sub">
      :
      PAGE FOR PRINT
      CONTROL APPARATUS
      :
    </div>
  </body>
</html>
```

FIG.7B

```
<html>
  <head>
    <title>
      Test
    </title>
  </head>
  <body>
    :
    PAGE FOR IMAGE
    FORMING APPARATUS
    :
    <!-sub
    :
    PAGE FOR PRINT
    CONTROL APPARATUS
    :
    -->
  </body>
</html>
```

FIG.7C

```
<html>
  <head>
    <title>
      Test
    </title>
  </head>
  <body>
    <div id="main">
      :
      PAGE FOR IMAGE
      FORMING APPARATUS
      :
    </div>
  </body>
</html>
```

FIG.7D

```
<html>
  <head>
    <title>
      Test
    </title>
  </head>
  <body>
    :
    PAGE FOR IMAGE
    FORMING APPARATUS
    :
  </body>
</html>
```

FIG.10

| SETTING ITEM | SETTING |
|:---:|:---:|
| FTP | OFF |
| SMTP | OFF |
| POP3 | ON |
| WINS | OFF |
| SNTP | ON |

FIG.12A

EXECUTION RESULT DISPLAY SCREEN

■ SCAN ORIGINAL AND SEND DATA TO FTP SERVER

TRANSMISSION TO FTP SERVER IS NORMALLY TERMINATED.

HELP FOR EXECUTION RESULT DISPLAY SCREEN

■ SCAN ORIGINAL AND SEND DATA TO FTP SERVER

PRESS OK BUTTON, AND SCREEN RETURNS TO MENU SCREEN.

IMAGE FORMING SYSTEM INCLUDING WEB SERVER AND SCREEN UPDATE REQUESTS, WEB BROWSER-EQUIPPED PRINT CONTROL APPARATUS, AND WEB BROWSER-EQUIPPED IMAGE FORMING APPARATUS, AND METHOD OF FORMING IMAGE IN IMAGE FORMING SYSTEM

BACKGROUND OF THE INVENTION

1. Field of the Invention

The present invention relates to an image forming system including a web server, a web browser-equipped print control apparatus, and a web browser-equipped image forming apparatus, and a method of forming an image in the image forming system.

2. Description of the Related Art

Conventionally, there has been known an information processing system configured such that an information processing apparatus, such as a PC, is connected to a web server on a network, and an operation screen provided by the web server is displayed on a web browser provided in the information processing apparatus.

In the conventional information processing system, the web browser of the information processing apparatus requests the web server to provide an operation screen. In response to this request, a web application on the web server sends to the information processing apparatus an HTML (hypertext markup language) file for causing the web browser to display the operation screen. The web browser of the information processing apparatus analyzes the received HTML file and displays an operation screen based on a description of the HTML file.

When the user inputs an instruction via the operation screen displayed on the web browser, the web browser sends the input instruction to the web server. Then, the web application on the web server having received the instruction carries out processing according to the received instruction.

Recently, some of image forming apparatuses equipped with a scanner function and a printer function are provided with a web browser as well. An image forming apparatus of this type displays on the web browser thereof an operation screen provided by the web server, following the above-mentioned procedure, and accepts various instructions from the user via the displayed operation screen.

Further, some image forming apparatuses have a print control apparatus attached thereto. The print control apparatus is used to provide an image forming apparatus with a network printer function or to expand and supplement a network printer function originally provided in an image forming apparatus. Some print control apparatuses are provided with an operation screen and a web browser, and a print control apparatus of this type is capable of receiving an HTML file from the web server and displaying an operation screen based on a description of the HTML file.

On the other hand, there has been proposed a so-called multi-display system including a plurality of displays and configured to display an operation screen on each of the displays (see e.g. Japanese Patent Laid-Open Publication No. 2005-085057). The multi-display system acquires an operation screen from a web server and displays the operation screen on each of the displays. More specifically, a browser controller requests a proxy section, based on an address input via an input device, to acquire an operation screen. In response to this request, the proxy section acquires contents from the web server. When the operation screen is acquired from the web server, an image display unit displays only its own display area portion of the operation screen By the way, operation screen display data stored in the web server may be requested by the web browser of the print control apparatus or by the web browser of the image forming apparatus. Further, for example, in a case where the web browser of the image forming apparatus issues the request, it is sometimes desired not only to update the display contents of the web browser of the image forming apparatus, but also to update the display contents of the web browser of the print control apparatus in timing synchronous with the update on the web browser of the image forming apparatus. On the other hand, in a case where the web browser of the print control apparatus issues the request, it is sometimes desired to update the display contents of the web browser of the print control apparatus, but not to update the display contents of the web browser of the image forming apparatus. Conventionally, however, it is impossible to switch between an operation for updating both the display contents of the web browser of the image forming apparatus and the display contents of the web browser of the print control apparatus, and an operation for updating the display contents of only one of the two web browsers, depending on which of the two browsers has requested the display data. More specifically, the multi-display system disclosed in Japanese Patent Laid-Open Publication No. 2005-085057 can perform only an operation for updating the display contents of all the displays, when the proxy section acquires contents from the web server.

SUMMARY OF THE INVENTION

The present invention provides an image forming system which is capable of properly causing cooperation between operation screens respectively displayed on the web browser of a print control apparatus and that of an image forming apparatus, and a method of forming an image in the image forming system.

In a first aspect of the present invention, there is provided an image forming system including a web server, a print control apparatus provided with a web browser, and an image forming apparatus provided with a web browser, wherein the web server comprises a reception unit configured to receive a screen update request from the print control apparatus, a determination unit configured to determine whether the screen update request received by the reception unit is a request issued from the web browser of the print control apparatus or a request issued from the web browser of the image forming apparatus, and a transmission unit configured to be operable when the determination unit determines that the screen update request received by the reception unit is a request issued from the web browser of the print control apparatus, to transmit screen data for causing the web browser of the print control apparatus to display an operation screen to the print control apparatus, and when the determination unit determines that the screen update request received by the reception unit is a request issued from the web browser of the image forming apparatus, to transmit screen data for causing the web browser of the image forming apparatus to display an operation screen and screen data for causing the web browser of the print control apparatus to display an operation screen to the print control apparatus.

In a second aspect of the present invention, there is provided a method of forming an image in an image forming system including a web server, a print control apparatus provided with a web browser, and an image forming apparatus provided with a web browser, comprising, in the web server, receiving a screen update request from the print control apparatus, determining whether the received screen update request is a request issued from the web browser of the print control apparatus or a request issued from the web browser of the image forming apparatus, and transmitting, when it is determined that the received screen update request is a request issued from the web browser of the print control apparatus, screen data for causing the web browser of the print control apparatus to display an operation screen to the print control apparatus, and transmitting, when it is determined that the received screen update request is a request issued from the web browser of the image forming apparatus, screen data for causing the web browser of the image forming apparatus to display an operation screen and screen data for causing the web browser of the print control apparatus to display an operation screen to the print control apparatus.

According to the present invention, the web server is capable of transmitting the operation screen for the print control apparatus and the operation screen for the image forming apparatus in response to a single request, and hence it is possible to display the operation screens on the web browser of the print control apparatus and that of the image forming apparatus in properly synchronized timing. This enables the print control apparatus to display operation support information associated with an operation screen to be displayed on the image forming apparatus, whereby it is possible to provide a more userfriendly system. Further, it is possible to select optimal operation screens for the image forming apparatus and the print control apparatus, respectively, according to configuration information, such as setting data on the image forming apparatus, which is stored in the web server. Furthermore, transition of the operation screen in the print control apparatus alone is also enabled, which makes it is possible to provide a more userfriendly system without degrading the operability of the print control apparatus.

The features and advantages of the invention will become more apparent from the following detailed description taken in conjunction with the accompanying drawings.

BRIEF DESCRIPTION OF THE DRAWINGS

FIGS. 7A to 7D are diagrams showing examples of HTML files generated by a presentation section appearing in FIG. 5.

FIG. 10 is a diagram showing an example of a security setting database.

FIGS. 12A and 12B are views showing examples of an execution result display screen and a help screen associated therewith which are respectively displayed on the image forming apparatus and the print control apparatus appearing in FIG. 1.

DETAILED DESCRIPTION OF THE EMBODIMENTS

The present invention will now be described in detail below with reference to the accompanying drawings showing embodiments thereof.

Figure 1:
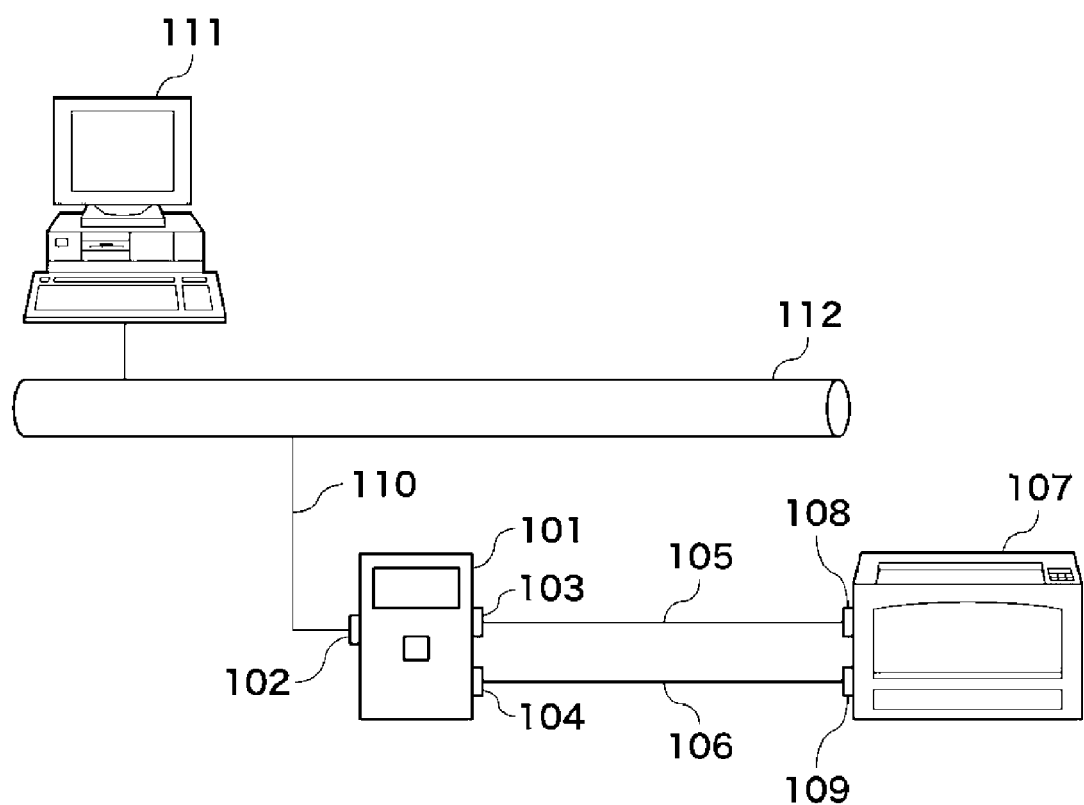
FIG. 1 is a schematic diagram of an image forming system according to a first embodiment of the present invention.

FIG. 1 is a schematic diagram of an image forming system according to a first embodiment of the present invention.

As shown in FIG. 1, the image forming system according to the present embodiment is mainly comprises a web server 111, a print control apparatus 101, and an image forming apparatus 107.

The print control apparatus 101 is provided with a plurality of (two in the present example) network interface cards (hereinafter acronymized as "NICs") 102 and 103. The print control apparatus 101 is connected to a network 112 via the NIC 102.

The web server 111 is also connected to the network 112, and data output from the web server 111 is input to the print control apparatus 101 via the network 112, a signal line 110, and the NIC 102.

The print control apparatus 101 and the image forming apparatus 107 are connected to each other via the NIC 103 of the print control apparatus 101, a signal line 105, and a NIC 108 of the image forming apparatus 107. Further, the print control apparatus 101 and the image forming apparatus 107 are also connected to each other via a dedicated transmission path interface board 104 connected to the print control apparatus 101, a dedicated transmission line 106, and a dedicated transmission path interface board 109 connected to the image forming apparatus 107.

Figure 2:
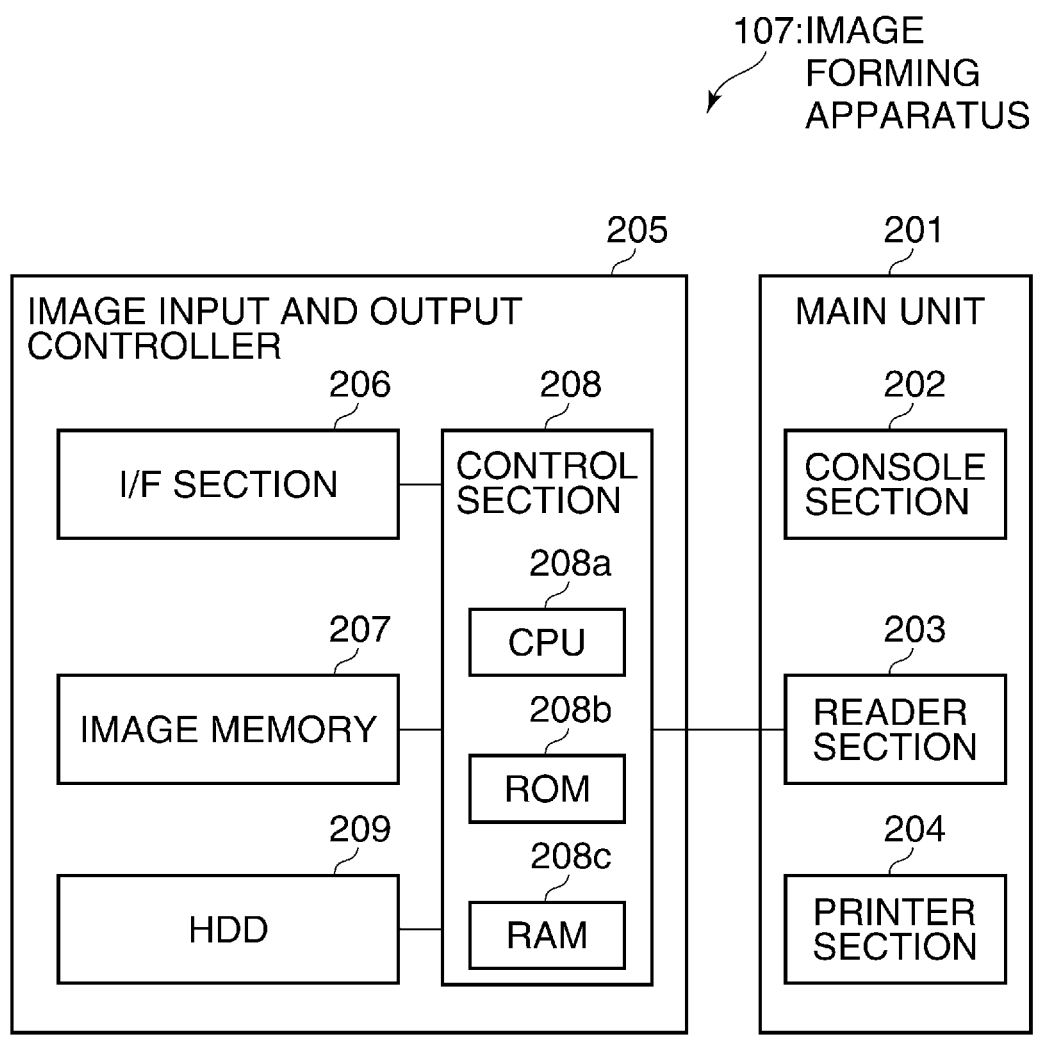
FIG. 2 is a schematic block diagram of an image forming apparatus appearing in FIG. 1.

FIG. 2 is a schematic block diagram of the image forming apparatus 107.

As shown in FIG. 2, the image forming apparatus 107 comprises an image forming apparatus main unit 201 and an image input and output controller 205.

The image forming apparatus main unit 201 comprises a console section 202, a reader section 203, and a printer section 204. The console section 202 is used to operate the image forming apparatus main unit 201 and the image input and output controller 205. The console section 202 has an operation display panel integrally mounted thereto. The reader section 203 reads an original image and outputs image data corresponding to the original image to the printer section 204 and the image input and output controller 205. The printer section 204 records, on a recording sheet, an image corresponding to image data received from the reader section 203 or the image input and output controller 205.

The image input and output controller 205 is connected to the reader section 203, and comprises an interface section 206, an image memory 207, a control section 208, and a hard disk drive (HDD) 209. The NIC 108 and the dedicated transmission path interface board 109 are connected to the interface section 206. It should be noted that the HDD 209 stores setting information on the image forming apparatus 107, including an address book, operation history, user settings, ID (identification) settings, and network settings, for example.

The interface section 206 provides interface between the print control apparatus 101 and the image forming apparatus 107. The interface section 206 receives code data representing image data transferred from the print control apparatus 101, by the dedicated transmission path interface board 109. Then, the interface section 206 passes the received code data to the control section 208 after converting the same to image data recordable by the printer section 204. The interface section 206 also receives code data representing image data sent from the print control apparatus 101, by the NIC 108. Then, the interface section 206 passes the received code data to the control section 208 after converting the same to image data recordable by the printer section 204, if required. In the present embodiment, the NIC 108 is implemented by an Ethernet (registered trademark) interface or a like network interface, and the image forming apparatus 107 is connected to the print control apparatus 101 via the network. However, this is not limitative, but a parallel interface, a USB (universal serial bus) interface, or the like interface may be employed. In this case, the image forming apparatus 107 is directly connected to the print control apparatus 101 e.g. by an interface cable. Further, not a single cable, but a plurality of cables may be used.

The control section 208 comprises a CPU 208a, a ROM 208b, and a RAM 208c. The CPU 208a executes a control program stored in the ROM 208b or another storage medium, by loading the program into the RAM 208c. This causes the CPU 208a to control data flow between the reader section 203, the interface section 206, the image memory 207, and so forth. It should be noted that a nonvolatile memory where data is not erased even if power supply is stopped may be provided in place of the HDD 209. In this case, data stored in the HDD 209 is stored in the nonvolatile memory.

Figure 3:
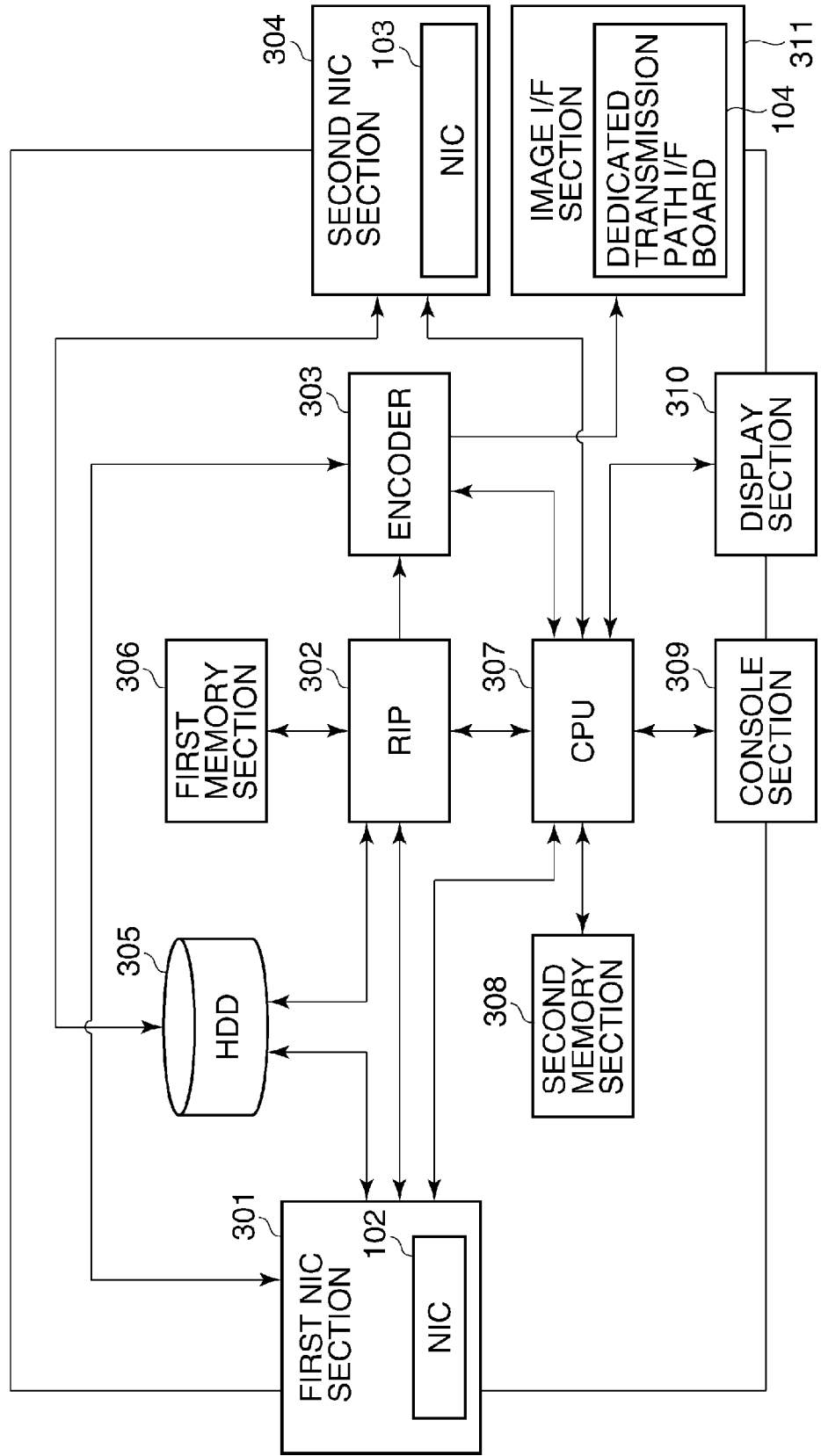
FIG. 3 is a schematic block diagram of a print control apparatus appearing in FIG. 1.

FIG. 3 is a schematic block diagram of the print control apparatus 101.

As shown in FIG. 3, the print control apparatus 101 is provided with a first NIC section 301, and the first NIC section 301 includes the NIC 102. Although a description of the present embodiment is given by limiting the interface connected to the network to the NIC, an interface of another type connectable to the network may be employed.

The first NIC section 301 functions as a first network interface that provides low-layer level connection to a LAN (local area network). Connected to the first NIC section 301 are a RIP (raster image processor) 302 and a hard disk drive (HDD) 305. The RIP 302 has a function of converting received data in a print language, such as PDL (page description language), or in a specific data format (compressed e.g. by JBIG (joint bi-level image experts group)) to raster image data. The HDD 305 functions as a storage unit for temporarily spooling print data received via the first NIC section 301 or compressed data having undergone RIP processing. A first memory section 306 is a memory which the RIP 302 uses for image rasterization.

The data converted to raster image data by the RIP 302 is input to an encoder 303. The encoder 303 converts the received data to print data in a format or data in a data format supported by the image forming apparatus 107.

Further, the print control apparatus 101 is provided with a second NIC section 304 and an image interface section 311.

Similarly to the first NIC section 301, the second NIC section 304 includes the NIC 103, and functions as a second network interface that provides low-layer level connection. Data output from the encoder 303 is delivered to the image forming apparatus 107 via the image interface section 311.

Furthermore, the print control apparatus 101 includes a CPU 307, a second memory section 308, a console section 309, and a display section 310. The CPU 307 controls the overall operation of the print control apparatus 101, and the second memory section 308 is used as a temporary storage area by the CPU 307. The console section 309 includes buttons and keys, and a user uses the console section 309 to operate the print control apparatus 101. The display section 310 displays images and characters on a screen to thereby give information to the user. The display section 310 is provided with an operation panel integrally formed with the console section 309, and in the present embodiment, the touch panel type is employed. An external monitor (display) and an external operation unit (mouse/keyboard) may be additionally connected to the print control apparatus 101.

The print control apparatus 101 transfers data onto the dedicated transmission line 106 via the image interface section 311 to send the same to the image forming apparatus 107.

Data packets from the web server 111 to the print control apparatus 101 are transferred over the network 112 and are input to the print control apparatus 101 via the NIC 102. In the print control apparatus 101, the first NIC section 301 carries out processing for receiving the data packets. If the data packets received by the first NIC section 301 are compliant with TCP/IP (transmission control protocol/internet protocol), the header information section of each packet contains a destination port number.

A destination port number is information for specifying a program or process in an apparatus to which each packet received by the apparatus should be delivered, and different port numbers are assigned according to communication protocols and programs.

For example, port numbers are assigned as follows:
FTP (file transfer protocol)=Port 21
SMTP (simple mail transfer protocol)=Port 25
HTTP (hypertext transfer protocol)=Port 80
Therefore, by determining whether or not a port number contained in the header of each received data packet is associated with print processing, it is possible to determine whether the packet is print data or other data such as control data.

When it is determined that the received data packets are print data, the CPU 307 writes the print data in the HDD 305, as required. This operation is queuing (spooling) generally performed e.g. for the purpose of increasing data transfer rate. The print data written in the HDD 305 is read out from the HDD 305 to the RIP section 302 according to an instruction from the CPU 307. On the other hand, print data not subjected to queuing is directly transferred from the first NIC section 301 to the RIP 302 according to an instruction from the CPU 307.

The print data thus sent to the RIP 302 is converted to raster image data by the RIP 302. Subsequently, based on a preset data format interpretable by the image forming apparatus 107 and a data format of the received print data, the encoder 303 encodes the received print data into the data format interpretable by the image forming apparatus 107. Although in the present embodiment, the preset data format is used, this is not limitative, but an image format acquired from the image forming apparatus 107 by communication or one designated via the console section 309 may be used.

The encoding processing is performed as required, and therefore e.g. when the data format of the received print data is immediately interpretable by the image forming apparatus 107, i.e. when encoding is dispensable, it is possible to omit the processing. The data format of the encoded data is a format interpretable by the image forming apparatus 107. Data formats interpretable by the image forming apparatus 107 include, by way of example, predetermined print language formats, data formats for compression of data by respective predetermined methods, such as JBIG, document formats, etc., and vary depending on the capability of interpretation means incorporated in the image forming apparatus 107 and the like.

The data thus encoded as required is converted again to data packets by the second NIC section 304, whereafter they are output onto the signal line 105 and thereby sent to the image forming apparatus 107.

Upon receiving the data packets, the image forming apparatus 107 prints an image corresponding to the received data packets on a recording medium, such as a paper sheet, according to a printing procedure of its own.

It should be noted that another data transfer method can be envisaged in which data is sent from the encoder 303 to the image interface section 311, then output onto the dedicated transmission line 106 through the dedicated transmission path interface board 104, and is finally received by the image forming apparatus 107 via the dedicated transmission path interface board 109 connected thereto.

Figure 4:
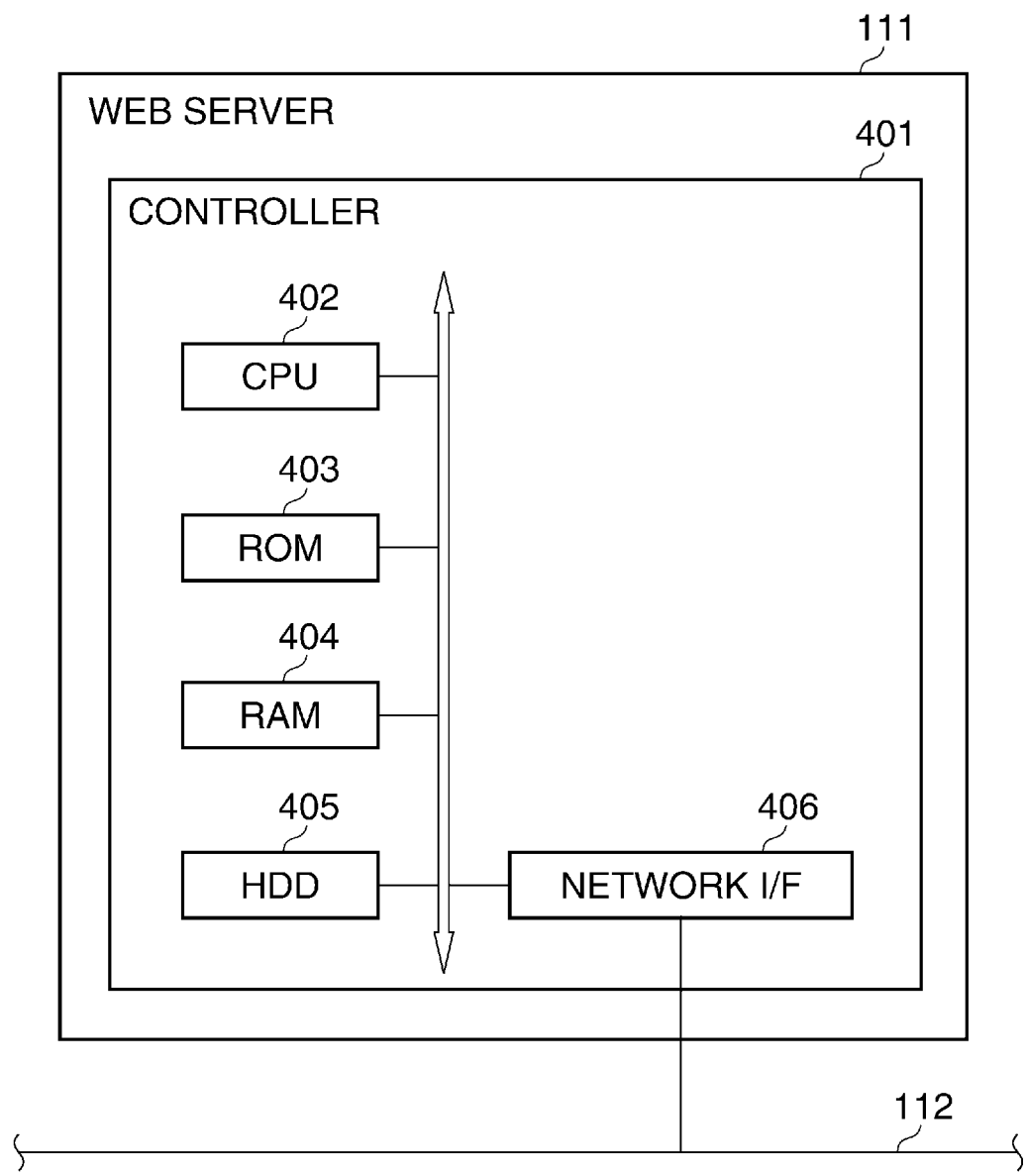
FIG. 4 is a schematic block diagram of a web server appearing in FIG. 1.

FIG. 4 is a schematic block diagram of the web server 111.

A controller 401 including a CPU 402 controls the overall operation of the web server 111. The CPU 402 reads out control programs stored in a ROM 403 to execute various control processes. A RAM 404 is used as a main memory and a temporary storage area, such as a work area, of the CPU 402. A HDD 405 stores image data, various programs, and various information tables, referred to hereinafter.

A network interface (I/F) 406 connects the controller 401, i.e. the web server 111 to the network 112. Transmission and reception of various kinds of information to and from other apparatuses on the network are performed via the network interface (I/F) 406.

Figure 5:
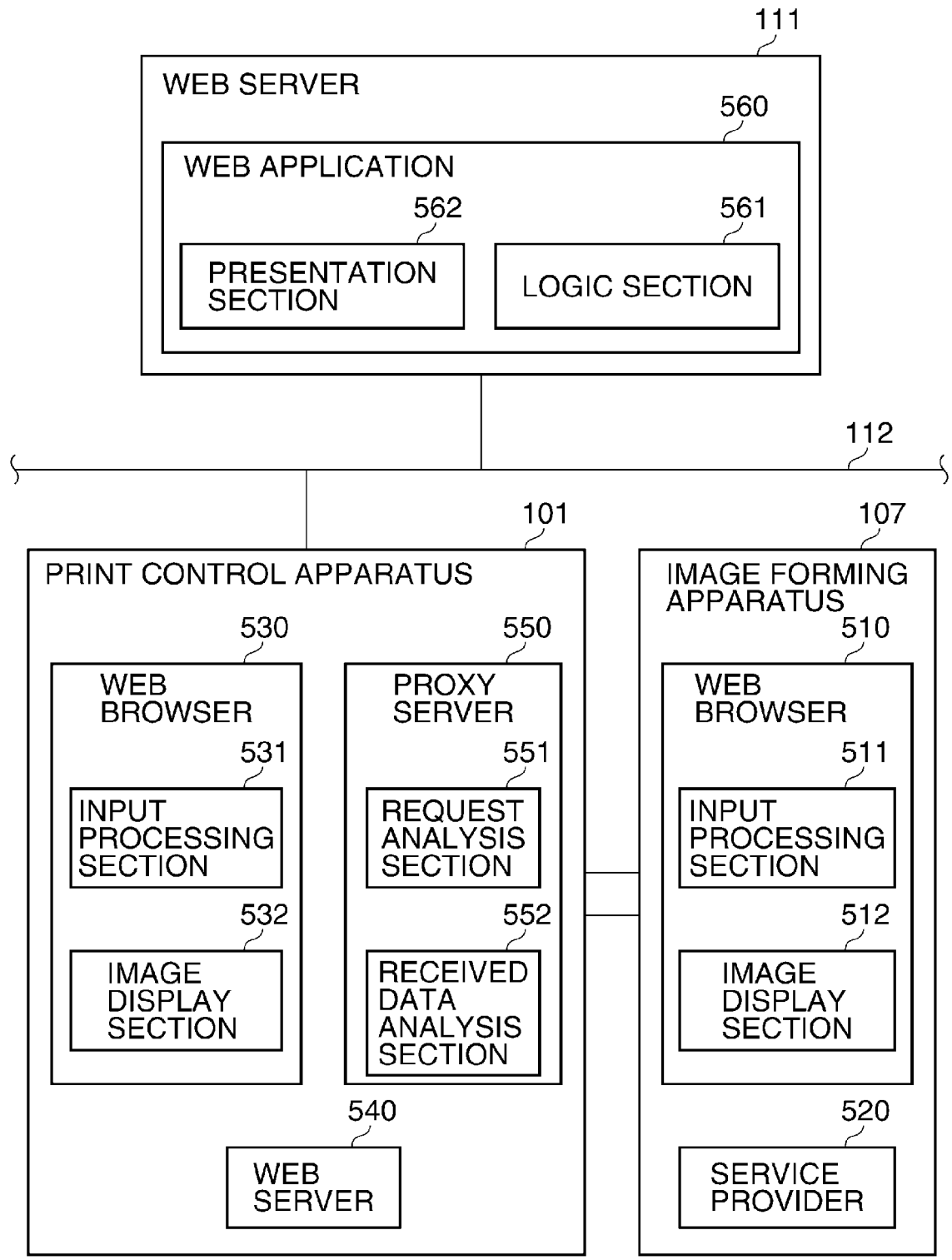
FIG. 5 is a block diagram of the software configuration of the entire image forming system in FIG. 1.

FIG. 5 is a block diagram of the software configuration of the entire image forming system according to the present embodiment. Functional blocks appearing in FIG. 5 are realized through execution of control programs by the CPUs provided in the image forming apparatus 107, the print control apparatus 101 and the web server 111, respectively.

The image forming apparatus 107 is provided with a web browser 510 and a service provider 520. The web browser 510 has an input processing section 511 and an image display section 512. The input processing section 511 analyzes a user operation performed on the console section 202, and transmits a screen update request via the interface section 206 according to HTTP, for example. The image display section 512 analyzes a received HTML file and displays an operation screen on the console section 202. The screen thus displayed will be hereinafter referred to as "the web browser screen". The service provider 520 receives a request for processing from a logic section 561 within a web application 560 in the web server 111 via the interface section 206, and generates and executes a job for carrying out the processing.

The print control apparatus 101 is provided with a web browser 530, a web server 540, and a proxy server 550. The web browser 530 includes an input processing section 531 and an image display section 532, and has the same functions as those of the web browser 510. Upon receiving a request from the web browser 510 or the web browser 530 via the proxy server 550, the web server 540 generates a screen corresponding to the request and outputs the generated screen as a reply. The proxy server 550 receives a request from the web browser 510 or the web browser 530 and transfers the received request to an appropriate one of the web server 540 and the web server 111. A request analysis section 551 analyzes the contents of the request to determine which of the web server 540 and the web server 111 the request is to be transferred to. Further, the proxy server 550 receives an HTML file generated and transmitted in response to the request by one of the web servers, i.e. a web server to which the request received by the proxy server 550 was transferred, and transfers the HTML file to the web browser of the request source. A received data analysis section 552 analyzes the HTML file for data transfer.

The web server 111 is provided with the web application 560. The web application 560 includes a presentation section 562 and the logic section 561. The presentation section 562 generates a screen to be displayed on the web browser of an external apparatus, in response to a request from the external apparatus, and sends the screen as a reply. When the request from the external apparatus is a request for processing by the image forming apparatus 107, the web application 560 carries out various kinds of processes according to the contents of the request, and then requests the image forming apparatus 107 to execute the processing. As an example of the processing to be executed by the image forming apparatus 107, there may be mentioned execution of a print process by the printer section 204, execution of a reading process by the reader section 203, or execution of a transmission process by the interface section 206.

A control process executed by the image forming system constructed as described above will be described in detail with reference to FIGS. 6A and 6B to 12A and 12B.

In the present embodiment, when the web server 111 sends different screen data items to the image forming apparatus 107 and the print control apparatus 101, respectively, the control process is performed to cause cooperation between a screen to be displayed on the image forming apparatus 107 and a screen to be displayed on the print control apparatus 101. Although in the present embodiment, the image forming apparatus 107 is provided with the single NIC, it is to be understood that the present invention can also be applied to an image forming apparatus provided with a plurality of NICs.

Figure 6A:
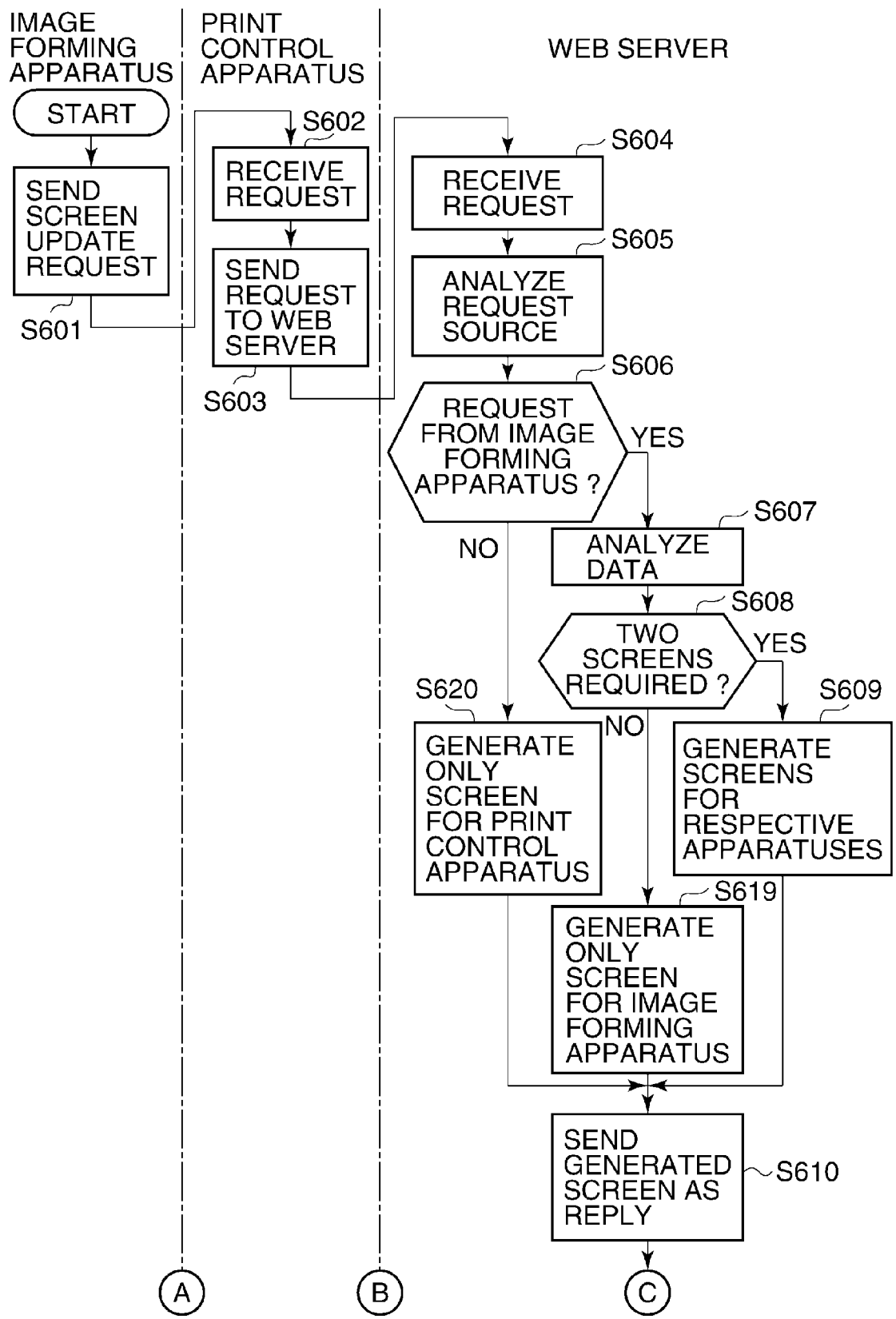
FIGS. 6A and 6B are a flowchart of a control process executed by the image forming system in FIG. 1.
Figure 6B:
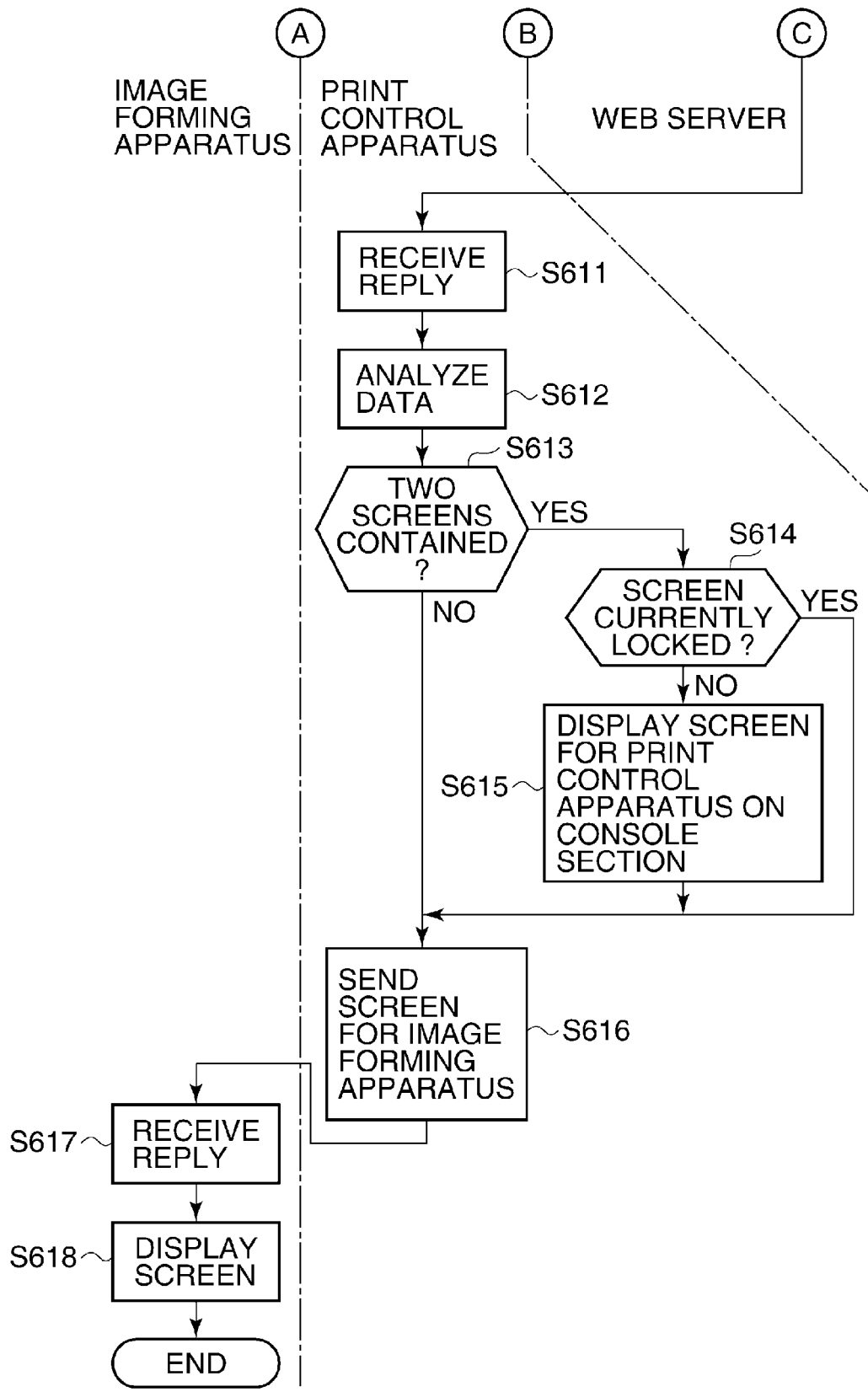

FIGS. 6A and 6B are a flowchart of the control process executed by the image forming system of the present embodiment. The present process is executed so as to send a file generated by the image forming apparatus 107 using the reader section 203 to the web server 111 by FTP.

When the image forming apparatus 107 and the print control apparatus 101 are started, the image forming apparatus 107 sends a screen update request to the web server 111 in a step S601 so as to acquire a menu screen to be displayed on the web browser 510 of the image forming apparatus 107. Information on the web browser 510 of the image forming apparatus 107 (e.g. a browser version and an apparatus name) is added to packets of the request. Further, in a case where the acquired screen is to be displayed on the image forming apparatus 107 alone, the information indicating that the acquired screen is to be displayed on the image forming apparatus 107 alone is also added to the request packets. In the present embodiment, these information items are stored in an HTTP user-agent tag, but they may be stored in another type of tag, a comment, or a body of a HTTP request. Further, another protocol may be used in place of HTTP. Furthermore, although in the present embodiment, the screen update request is transmitted to the web server 111, it may be sent to the print control apparatus 101.

After the image forming apparatus 107 transmits the screen update request, the process proceeds to a step S602. The step S602 is carried out by the print control apparatus 101. When the proxy server 550 of the print control apparatus 101 receives the request in the step S602, the request analysis section 551 of the proxy server 550 analyzes the received request. At this time, the request analysis section 551 determines that the request has been transmitted to the web server 111, and the process proceeds to a step S603.

In the step S603, the print control apparatus 101 sends the request to the web server 111 according to the result of the determination by the request analysis section 551, and the process proceeds to a step S604. The step S604 is carried out by the web server 111. When the web server 111 receives the request from the print control apparatus 101 in the step S604, the process proceeds to a step S605.

In the step S605, the presentation section 562 of the web application 560 performs analysis on the request source. The analysis on the request source is performed based on information on the image forming apparatus 107, which was caused to be contained in the request packets before transmission of the request in the step S601. When the analysis on the request source is completed, the process proceeds to a step S606.

In the step S606, processing is switched based on whether the request is from the image forming apparatus 107 or from the print control apparatus 101. If the request is from the image forming apparatus 107, the process proceeds to a step S607, whereas if the request is from the print control apparatus 101, the process proceeds to a step S620. In the step S620, the presentation section 562 generates a screen for the print control apparatus 101.

When the process proceeds to the step S607, the presentation section 562 analyzes data of the request received from the image forming apparatus 107. More specifically, the presentation section 562 analyzes a data portion of the request and determines what process is requested by the request, to thereby determine whether or not the request is executable. In the present example, the request is assumed to be one for acquisition of an initial screen, and therefore it is determined whether or not the initial screen is required to be changed using data stored in the web server 111. In this request of the present example, it is assumed to be determined that no change is needed, the presentation section 562 determines that a default initial screen is to be generated, and terminates the analysis. When the analysis is terminated, the process proceeds to a step S608.

In the step S608, the presentation section 562 determines based on the result of the analysis performed in the step S607 whether or not it is required to provide both of a screen for each of the image forming apparatus 107 and the print control apparatus 101. If it is determined both of the screens are required, the process proceeds to a step S609. On the other hand, if only the screen for the image forming apparatus 107 is required, the process proceeds to a step S619. In the step S619, the presentation section 562 generates only the screen for the image forming apparatus 107.

When the process proceeds to the step S609, the presentation section 562 generates a screen file that can be displayed on each of the web browsers 510 and 530. In the present embodiment, an HTML file is generated as the screen file, but another type of script file, such as a Java (registered trademark) Script file, may be generated.

FIGS. 7A to 7D are diagrams showing examples of HTML files generated by the presentation section 562. These HTML files are sent to the web browser 510 of the image forming apparatus 107 and the web browser 530 of the print control apparatus 101.

FIG. 7A shows a case where a single HTML data file is generated, using a div tag, for screens to be respectively displayed on the image forming apparatus 107 and the print control apparatus 101. A portion from a tag <div id="main"> forms the screen for the image forming apparatus 107, while a portion from a tag <div id="sub"> forms the screen for the print control apparatus 101.

FIG. 7B shows a case where screens to be displayed on the image forming apparatus 107 and the print control apparatus 101 are distinguished from each other using HTML comments. A body of a body tag forms the screen for the image forming apparatus 107, and a portion written as a comment using a tag <!—sub forms the screen for the print control apparatus 101. The screen for the image forming apparatus 107 may also be described as a comment.

FIG. 7C shows a case where only a screen for the image forming apparatus 107 is formed by HTML using a div tag. Similarly, in a case where only a screen for the print control apparatus 101 is formed by HTML, only a portion indicated using the tag <div id="sub"> is written as a screen part.

FIG. 7D shows a case where only a screen for the image forming apparatus 107 is formed by HTML using a comment. Similarly, in a case where only a screen for the print control apparatus 101 is formed by HTML, only a portion indicated using the tag <!—sub as a comment is written as a screen part.

When the presentation section 562 completes screen generation, the process proceeds to a step S610. In the step S610, the web server 111 sends the screen generated by the presentation section 562 to the print control apparatus 101, as a reply, and the present process proceeds to a step S611.

The step S611 is carried out by the print control apparatus 101. After the proxy server 550 of the print control apparatus 101 receives reply packets in the step S611, the process proceeds to a step S612. In the step S612, the received data analysis section 552 of the proxy server 550 analyzes data of the received reply packets. The analysis of the reply packets, i.e. HTML data is performed by the same method as used by the web server 111 in the step S609 for generation of the HTML data, i.e. the screen. More specifically, the number of screens generated using div tags or comments and contained in the reply packet is analyzed. When the analysis is completed, the process proceeds to a step S613.

In the step S613, it is determined whether or not the received data analysis section 552 has detected data for two screens. If the received data analysis section 552 has detected data for two screens, it is judged that it is required to display a screen on each of the print control apparatus 101 and the image forming apparatus 107, and the process proceeds to a step S614. On the other hand, if the received data analysis section 552 has detected data for only one screen, it is assumed in the illustrated example of the present embodiment that the data for only one screen is used to form a screen to be displayed on the image forming apparatus 107, and therefore the process proceeds to a step S616. It should be noted that the detected data for only one screen can form a screen to be displayed on the print control apparatus 101 alone, but this case will be described hereinafter in a second embodiment of the present invention.

In the step S614, the proxy server 550 determines whether or not it is possible to update the screen of the print control apparatus 101. This determination is performed by checking the setting of a screen update-permitting flag stored in the first memory section 306 or the HDD 305. If it is determined that the screen can be updated, the process proceeds to a step S615, whereas if not, the process directly proceeds to the step S616. A case where screen update is not permitted will be described hereinafter in the second embodiment.

In the step S615, the proxy server 550 generates HTML data for a screen to be displayed on the print control apparatus 101, based on the result of the analysis by the received data analysis section 552, so as to display the screen on the web browser 530. Then, the proxy server 550 overwrites contents of the web server 540 with the generated HTML data. The web browser 530 constantly polls specific contents of the web server 540. Therefore, when the HTML data of the web server 540 is updated by the proxy server 550, the screen on the print control apparatus 101 is updated. The screen may also be updated by performing reload using a timer or by a method in which the web server 540 having received the screen update request sends a reply to the Web browser 530 when the screen for the print control apparatus 101 is updated. Further, there may be employed a method of the received data analysis section 552 instructing the Web browser 530 to reload data of the screen. Further, a method may be employed in which the web browser 530 acquires data from the received data analysis section 552 instead of acquiring data from the web server 540. Furthermore, the received data analysis section 552 may transmit data directly to the web browser 530.

Figure 8A:
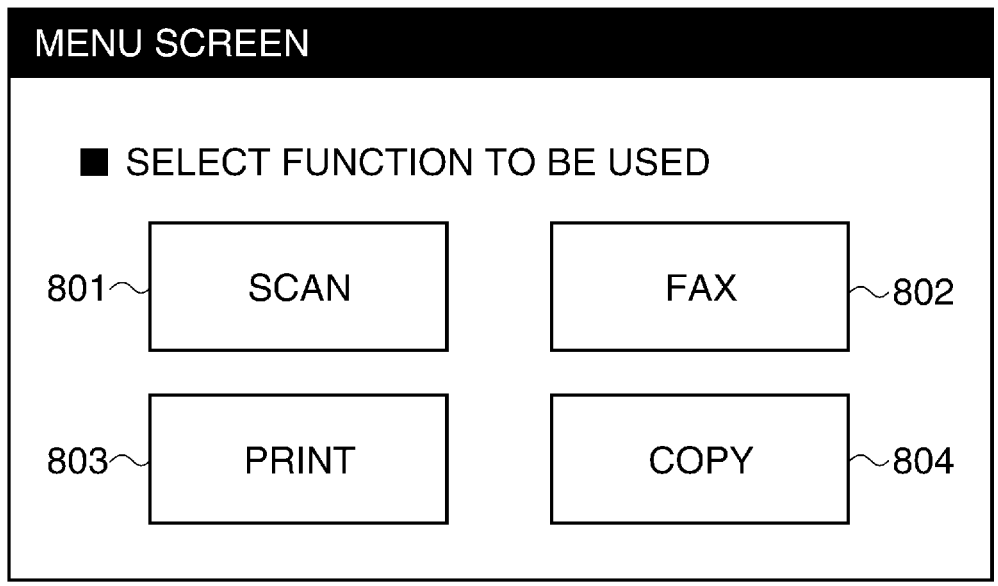
FIGS. 8A and 8B are views showing examples of a menu screen and a help screen associated therewith which are respectively displayed on the image forming apparatus and the print control apparatus appearing in FIG. 1.
Figure 8B:
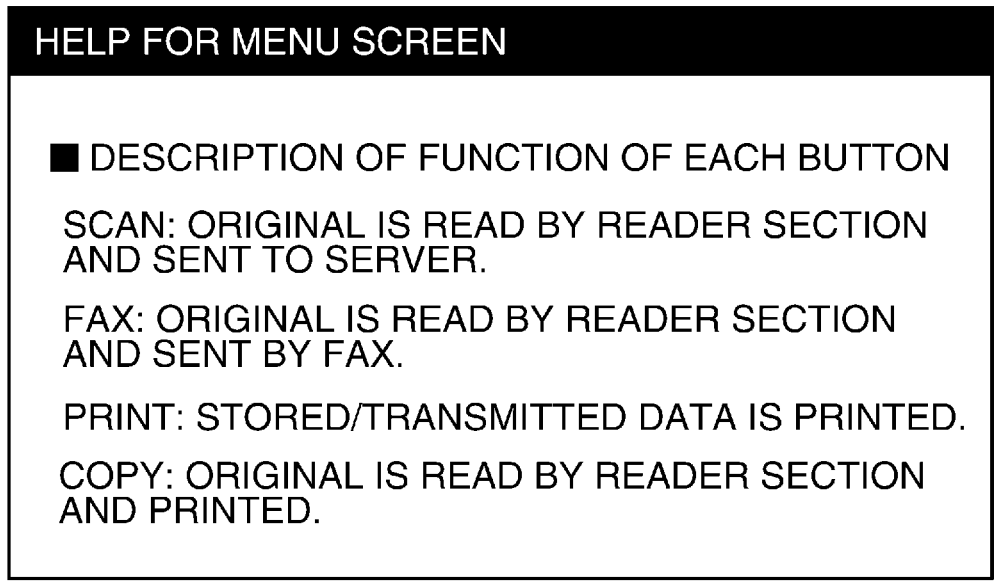

FIG. 8B shows an example of the screen displayed on the print control apparatus 101 in the step S615. When the screen is displayed on the print control apparatus 101, the process proceeds to the step S616.

In the step S616, the received data analysis section 552 generates a screen for the image forming apparatus 107, and sends the generated screen to the image forming apparatus 107, and the process proceeds to a step S617.

The step S617 is again a step to be executed by the image forming apparatus 107. In the step S617, the web browser 510 receives the reply data, and the process proceeds to a step S618. In the step S618, the input processing section 511 of the web browser 510 processes the HTML data, and the image display section 512 displays the screen.

FIG. 8A shows an example of the screen displayed on the image forming apparatus 107. Although in the present embodiment, the print control apparatus 101 regenerates HTML data, the print control apparatus 101 may send HTML data generated by the web server 111 to the image forming apparatus 107 without processing the same, and the image forming apparatus 107 may process the HTML data before displaying the screen.

The examples of the screens illustrated in FIGS. 8A and 8B, which are displayed on the web browsers 530 and 510 in the steps S615 and S618, respectively, when retrieving an initial screen for the image forming apparatus 107, are a menu screen and a help screen associated therewith. The screen of FIG. 8A is displayed on the image forming apparatus 107, and are provided with buttons 801 to 804 for use in selecting respective functions of the image forming apparatus 107. When the user operates the screen, the web browser 510 detects which of the buttons 801 to 804 has been pressed. When a function desired by the user is selected, the web browser 510 requests the web server 111 in the step S601 to provide a screen of the function associated with the button pressed by the user. On the other hand, the help screen of FIG. 8B is displayed on the print control apparatus 101 in association with the menu screen, and contains explanations of the respective buttons 801 to 804 of the image forming apparatus 107.

Figure 9A:
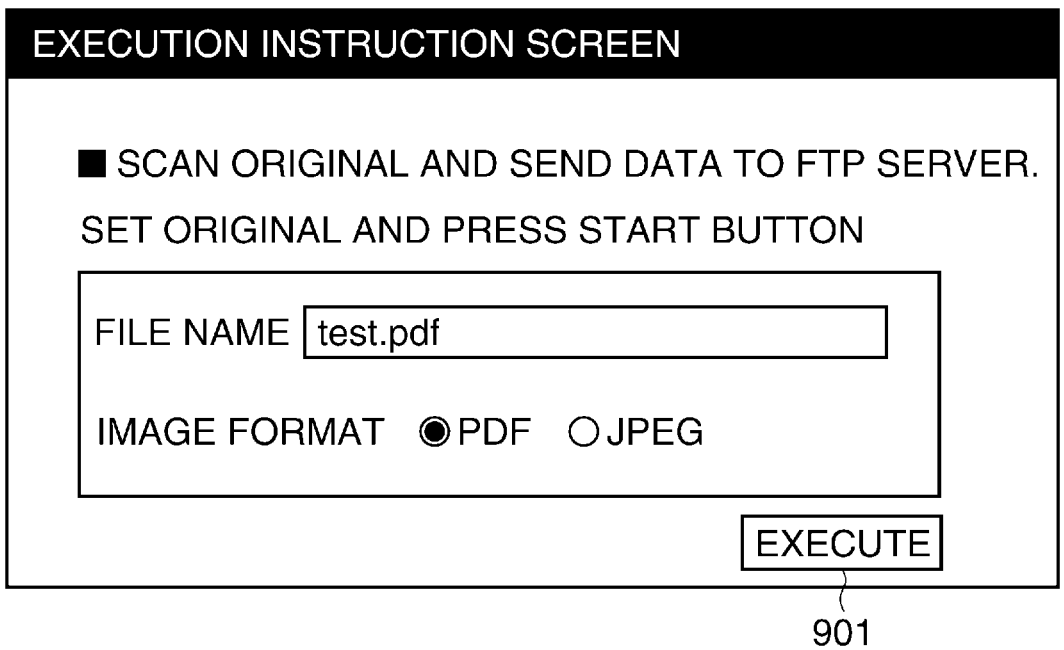
FIGS. 9A and 9B are views showing examples of a web application screen and an associated help screen respectively displayed on the image forming apparatus and the print control apparatus appearing in FIG. 1.
Figure 9B:
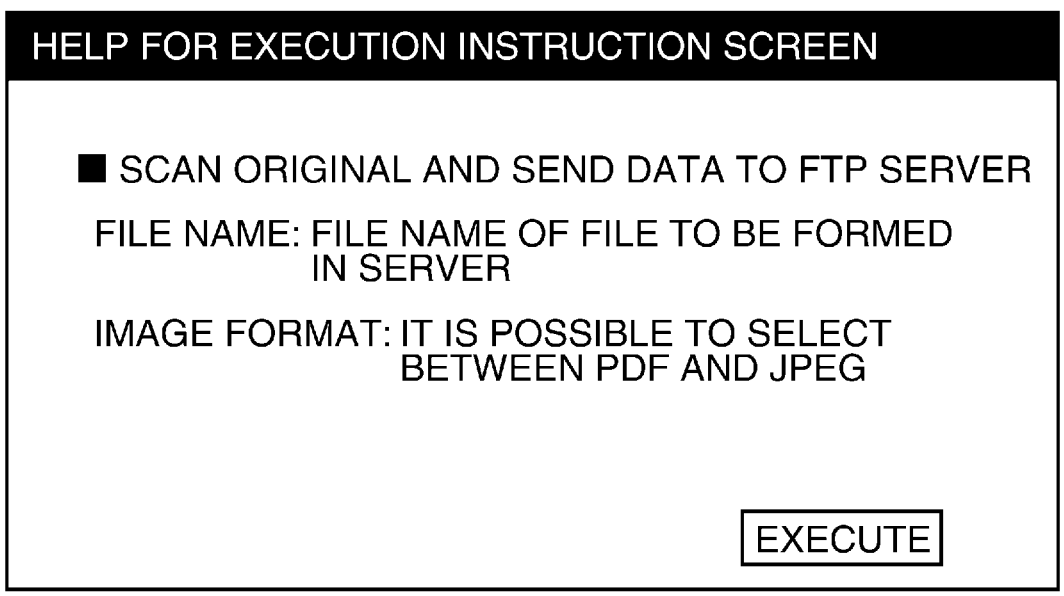
Figure 11A:
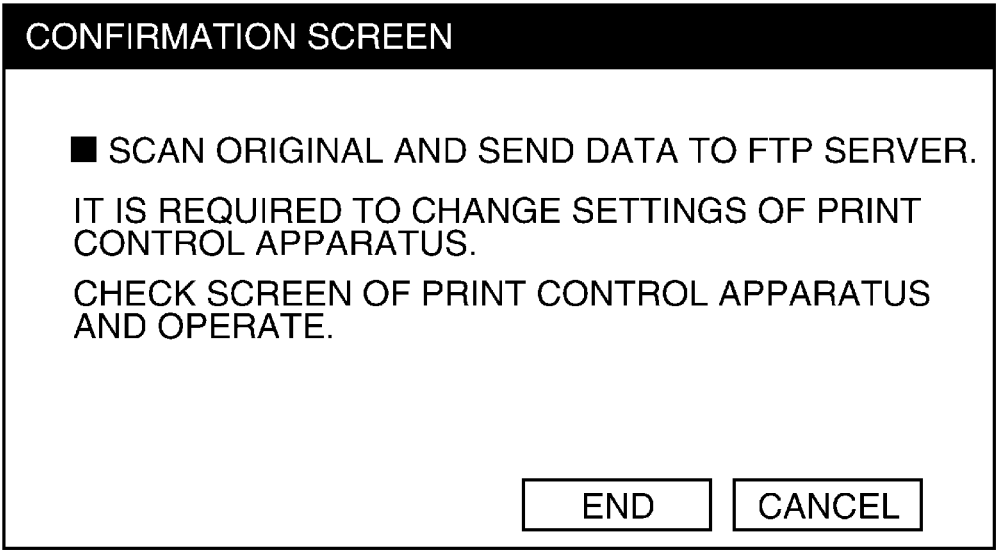
FIGS. 11A and 11B are views showing examples of a confirmation screen and a setting change screen respectively displayed on the image forming apparatus and the print control apparatus appearing in FIG. 1.
Figure 11B:
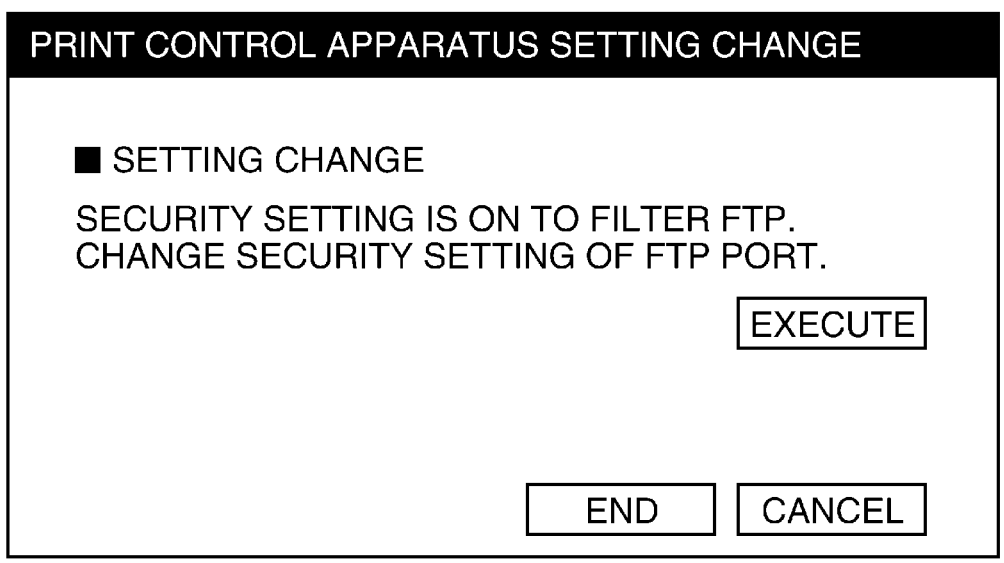

In the following, a description will be given of a control process executed when the button 801 is pressed to select a "scan" function assigned to the button 801. When the steps S601 to S618 are executed, screens shown in FIGS. 9A and 9B are displayed. FIG. 9A shows an execution instruction screen for instructing the web application 560 to cause the image forming apparatus 107 to generate image data by reading an image on an original using the reader section 203 and send the generated image data to an FTP server on the network 112. FIG. 9B shows a screen displaying help information associated with the menu screen in FIG. 9A.

In the example shown in FIG. 9A, settings are configured such that image data is generated in PDF format and a file name "test.pdf" is assigned to the image data. When depression of an "EXECUTE" button 901 is detected, the process proceeds to the step S601 in FIG. 6A, and the steps S601 to S607 are executed as described hereinbefore. In the step S607, the web application 560 searches a setting database of the print control apparatus 101, which is necessitated for execution of FTP operation. The setting database may be constructed on the HDD 405 of the web server 111 or on the HDD 305 of the print control apparatus 101. If the setting database is constructed on the HDD 305 of the print control apparatus 101, the web server 111 retrieves settings from the print control apparatus 101 on an as-needed basis. In the present embodiment, it is assumed that the setting database is constructed on the HDD 405 of the web server 111 and the settings are stored therein. In a case where the print control apparatus 101 is provided with a security function, the use of a port for use in transmission of FTP data can be inhibited in the print control apparatus 101. In such a case, there is a possibility that transmission of FTP data from the image forming apparatus 107 may fail. For this reason, the web application 560 determines whether or not the security configuration of the print control apparatus 101 permits FTP communication.

FIG. 10 is a diagram showing an example of a security setting database. As shown in FIG. 10, when the use of FTP is not permitted, the web application 560 determines in the step S608 that it is required to generate two screens, and the process proceeds to the step S609 so as to provide a screen for recommending a change of settings. In the step S609, the web application 560 generates an FTP port setting change screen illustrated in FIG. 11B, as a display screen for the print control apparatus 101. At the same time, as a screen for the image forming apparatus 107, the web application 560 generates a screen, shown in FIG. 11A, for prompting the user to check the screen for the print control apparatus 101. Alternatively, the web application 560 may determine in the step S608 that only one screen is required, and the process proceeds to the step S619, wherein a setting change screen for the print control apparatus 101 may be displayed on the screen of the image forming apparatus 107. When the steps S610 to S618 are executed, the screen shifts to an execution result display screen illustrated in FIG. 12A. The screen transition is performed following the same steps as described above. That is, when the user configures settings and the configuration is reflected in the print control apparatus 101, scanned image data is transmitted to the FTP server, whereby a processing completion message shown in FIG. 12A is displayed.

FIG. 12B is a view of an example of a help screen associated with the execution result display screen in FIG. 12A. In FIG. 12A, the result of execution is displayed as information for the user. When depression of an OK button 1201 is detected, the screen returns to the screen illustrated in FIG. 8A. The screen transition is performed following the same steps as described above.

Although in the present embodiment, a file is transferred to the web server 111, the file may be transferred to a server other than the web server 111, which is connected to the network.

Next, a description will be given of an image forming system according to the second embodiment of the present invention.

The image forming system of the present embodiment is distinguished from that of the first embodiment only by a part of the control process, and therefore it is assumed that hardware in the present embodiment is the same as that in the first embodiment, i.e. the hardware described with reference to FIGS. 1 to 4.

In the present embodiment, a case where it is desired to operate the screen of the print control apparatus 101 independently will be described. In the present embodiment, only a screen on the print control apparatus 101 is updated separately from a screen on the image forming apparatus 107 so as to enable processing dedicated to the print control apparatus 101. This corresponds to a case where settings of the print control apparatus 101 are changed or a case where a BOX function (i.e. a function for handling printable data stored in the HDD 305) of the print control apparatus 101 is used. In the following, a description will be given of a control process executed in the case of changing settings of the print control apparatus 101, with reference to FIGS. 13 to 15.

Figure 13:
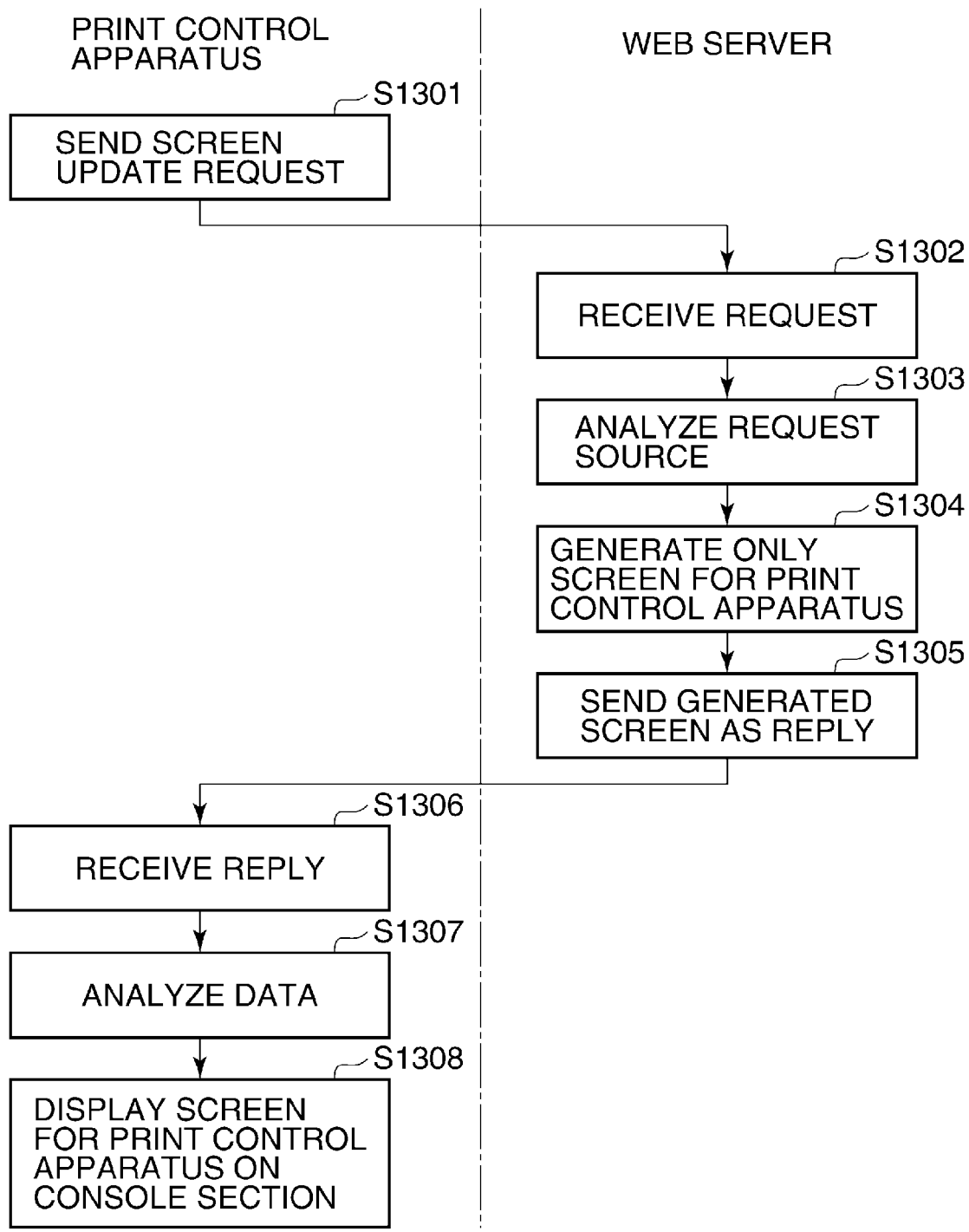
FIG. 13 is a flowchart of a control process executed by an image forming system according to a second embodiment of the present invention.

FIG. 13 is a flowchart of the control process executed by the image forming system according to the second embodiment.

Figure 14:
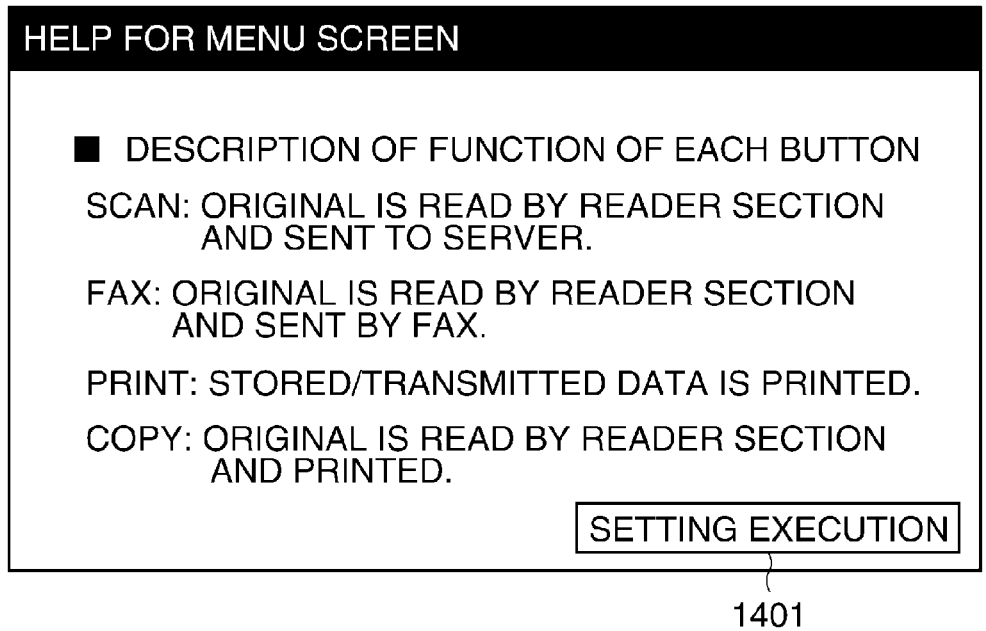
FIG. 14 is a view showing an example of an initial screen displayed on a print control apparatus included in the image forming system according to the second embodiment.

FIG. 14 shows an example of a screen to be displayed on the print control apparatus 101 when the print control apparatus 101 is started. The screen corresponds to a screen currently displayed on the image forming apparatus 107. When the print control apparatus 101 detects depression of a setting execution button 1401 by a user, the process proceeds to a step S1301. In the step S1301, the print control apparatus 101 sends a screen acquisition request to the web server 111, and then the process proceeds to a step S1302.

The step S1302 is executed by the web server 111. In the step S1302, the web server 111 receives the screen acquisition request, and the process proceeds to a step S1303, wherein the web server 111 analyzes a transmission source of the request. Similarly to the first embodiment, in the present embodiment as well, a user-agent tag is used, but another type of HTML tag or a comment may be used to identify the transmission source. Alternatively, a value or a MAC address uniquely assigned to an apparatus may be registered in the web server 111 in advance so as to be used as information for identifying the apparatus.

If the print control apparatus 101 is identified as the transmission source in the step S1303, the process proceeds to a step S1304, wherein a screen for the print control apparatus 101 is generated.

Figure 15:
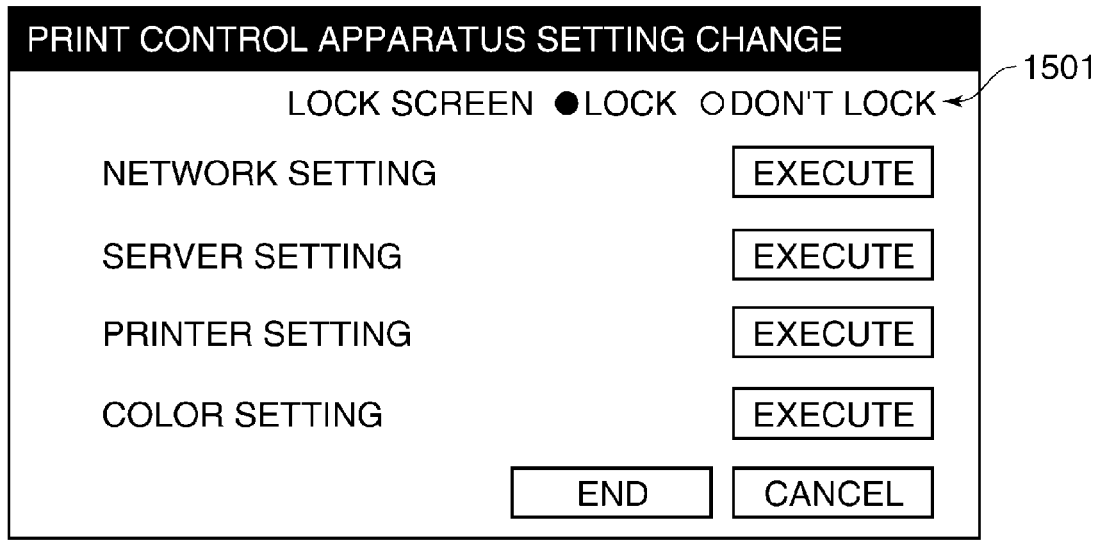
FIG. 15 is a view showing an example of a setting change screen displayed on the print control apparatus included in the image forming system according to the second embodiment.

FIG. 15 shows an example of the screen generated for the print control apparatus 101. A button 1501 in FIG. 15 is a radio button for use in selecting between "Lock" and "Don't lock" so as to lock or not lock the screen of the print control apparatus 101. When "Lock" is selected by the radio button 1501, the print control apparatus 101 shifts to a mode in which the screen on the print control apparatus 101 does not cooperate with the screen on the image forming apparatus 107. In this case, the web browser 530 of the print control apparatus 101 is reconfigured not to reload a screen, whereby the screen on the print control apparatus 101 prevented from cooperating with the screen on the image forming apparatus 107. Thus, the screen of the print control apparatus 101 is permitted to be changed only by a user operation performed via the web browser 530 of the print control apparatus 101. On the other hand, when "Don't lock" is selected, the reload setting of the web browser 530 is not changed, and the print control apparatus 101 remains in a mode that permits the screen thereon to cooperate with the screen on the image forming apparatus 107. In this case, there is a possibility that the screen on the print control apparatus 101 is updated by the image forming apparatus 107.

When the screen for the print control apparatus 101 is generated in the step S1304, the process proceeds to a step S1305, wherein the generated screen is sent as a reply to the print control apparatus 101, and the process proceeds to a step S1306.

The step S1306 is again a step to be executed by the print control apparatus 101. When the print control apparatus 101 receives the screen in the step S1306, the process proceeds to a step S1307, wherein the print control apparatus 101 analyzes the HTML data received from the web server 111. Since the web server 111 sends the reply (HTML data) in which a portion for the screen on the print control apparatus 101 is separated by a div tag and the like in the same manner as the image forming apparatus 107 sends the request, the print control apparatus 101 converts the received HTML data to a format that can be displayed by the web browser 530, and then the process proceeding to a step S1308. It should be noted that when the request is from the print control apparatus 101, the web browser 530 generates only one screen, and therefore screen designation using a div tag is not necessary for the web server to perform in generating HTML data in the step S1304. In this case, the data transmitted from the web server 111 can be directly displayed on the web browser 530 without execution of the step S1307.

In the step S1308, the proxy server 550 displays the screen on the web browser 530. It should be noted that when the user has performed selection using the radio button 1501 on the web browser 530, the setting may be changed such that reload is performed immediately, or alternatively, the setting may be changed when the user transmits a next request.

Although in the present embodiment, the print control apparatus is connected to the image forming system, the present invention can also be applied to a case where only the image forming apparatus is connected to the image forming system.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-279439, filed Dec. 9, 2009, which is hereby incorporated by reference herein in its entirety.

What is claimed is:

1. An image forming system including a web server, a print control apparatus provided with a web browser, and an image forming apparatus provided with a web browser, wherein the web server comprises:
a reception unit configured to receive a screen update request from the print control apparatus;
a determination unit configured to determine whether the screen update request received by said reception unit is a request issued from the web browser of the print control apparatus or a request issued from the web browser of the image forming apparatus; and
a transmission unit configured to be operable when said determination unit determines that the screen update request received by said reception unit is a request issued from the web browser of the print control apparatus, to transmit screen data for causing the web browser of the print control apparatus to display an operation screen to the print control apparatus, and when said determination unit determines that the screen update request received by said reception unit is a request issued from the web browser of the image forming apparatus, to transmit screen data for causing the web browser of the image forming apparatus to display an operation screen and screen data for causing the web browser of the print control apparatus to display an operation screen to the print control apparatus.

2. The image forming system according to claim 1, wherein when said determination unit determines that the screen update request received by said reception unit is a request issued from the web browser of the image forming apparatus, said transmission unit transmits the screen data for causing the web browser of the image forming apparatus to display an operation screen and the screen data for causing the web browser of the print control apparatus to display an operation screen, as a single screen data item, to the print control apparatus.

3. The image forming system according to claim 2, wherein the print control apparatus further comprises:
an analysis unit configured to analyze the screen data transmitted from said transmission unit and identify whether the screen data is the screen data for causing the web browser of the print control apparatus to display an operation screen or the screen data for causing the web browser of the image forming apparatus to display an operation screen, and
a display unit configured to display on the web browser of the print control apparatus an operation screen corresponding to the screen data identified by said analysis unit as the screen data for causing the web browser of the print control apparatus to display an operation screen.

4. The image forming system according to claim 3, wherein the print control apparatus further comprises a unit configured to transmit screen data identified by said analysis unit as the screen data for causing the web browser of the image forming apparatus to display an operation screen to the image forming apparatus.

5. A method of forming an image in an image forming system including a web server, a print control apparatus provided with a web browser, and an image forming apparatus provided with a web browser, comprising:
in the web server,
a receiving step of receiving a screen update request from the print control apparatus;
a determining step of determining whether the received screen update request is a request issued from the web browser of the print control apparatus or a request issued from the web browser of the image forming apparatus; and
a transmitting step of transmitting, when it is determined that the received screen update request is a request issued from the web browser of the print control apparatus, screen data for causing the web browser of the print control apparatus to display an operation screen to the print control apparatus, and transmitting, when it is determined that the received screen update request is a request issued from the web browser of the image forming apparatus, screen data for causing the web browser of the image forming apparatus to display an operation screen and screen data for causing the web browser of the print control apparatus to display an operation screen to the print control apparatus.

6. The method of forming an image according to claim 5, wherein when said determining step determines that the screen update request received by said receiving step is a request issued from the web browser of the image forming apparatus, said transmitting step transmits the screen data for causing the web browser of the image forming apparatus to display an operation screen and the screen data for causing the web browser of the print control apparatus to display an operation screen, as a single screen data item, to the print control apparatus.

7. The method of forming an image according to claim 6, wherein the method further comprises:
an analyzing step of analyzing the screen data transmitted from said transmitting step and identifying whether the screen data is the screen data for causing the web browser of the print control apparatus to display an operation screen or the screen data for causing the web browser of the image forming apparatus to display an operation screen, and
a displaying step of displaying on the web browser of the print control apparatus an operation screen corresponding to the screen data identified by said analyzing step as the screen data for causing the web browser of the print control apparatus to display an operation screen.

8. The method of forming an image according to claim 7, wherein the print control apparatus transmits screen data identified by said analyzing step as the screen data for causing the web browser of the image forming apparatus to display an operation screen to the image forming apparatus.

9. A non-transitory computer-readable storage medium storing a program for causing a computer to execute a method of forming an image in an image forming system including a web server, a print control apparatus provided with a web browser, and an image forming apparatus provided with a web browser, the method comprising:
in the web server,
receiving a screen update request from the print control apparatus;
determining whether the received screen update request is a request issued from the web browser of the print control apparatus or a request issued from the web browser of the image forming apparatus; and
transmitting, when it is determined that the received screen update request is a request issued from the web browser of the print control apparatus, screen data for causing the web browser of the print control apparatus to display an operation screen to the print control apparatus, and transmitting, when it is determined that the received screen update request is a request issued from the web browser of the image forming apparatus, screen data for causing the web browser of the image forming apparatus to display an operation screen and screen data for causing the web browser of the print control apparatus to display an operation screen to the print control apparatus.

* * * * *